United States Patent [19]
Nakashima et al.

[11] Patent Number: 5,440,952
[45] Date of Patent: Aug. 15, 1995

[54] ROTARY TABLE WITH INDEX APPARATUS

[75] Inventors: Kunimichi Nakashima, Anjo; Takumi Hattori, Kariya, both of Japan

[73] Assignee: Toyoda Koki Kabushiki Kaisha, Kariya, Japan

[21] Appl. No.: 110,976

[22] Filed: Aug. 24, 1993

[30] Foreign Application Priority Data

Aug. 26, 1992 [JP] Japan .................................. 4-226587

[51] Int. Cl.⁶ ............................................. B23B 29/24
[52] U.S. Cl. ................... 74/813 L; 74/813 R; 198/345.3; 198/346.1; 198/375
[58] Field of Search ............... 74/813 R, 813 L, 822, 74/826; 198/345.3, 346.1, 375, 379

[56] References Cited
U.S. PATENT DOCUMENTS 3,718,055  2/1973  Maier ........................... 74/813 L
3,797,333  3/1974  Maier .

Primary Examiner—Charles A. Marmor
Assistant Examiner—Troy Grabow
Attorney, Agent, or Firm—Oblon, Spivak, McClelland, Maier & Neustadt

[57] ABSTRACT

A rotary table with an index apparatus. The index apparatus includes first and second circular coupling gears disposed on a table in coaxial relationship with the rotational axis of the rotary table. The first coupling gear is fixed to the rotary table via a circular support member made of an elastic material while the second coupling gear is fixed to the table base. A third circular coupling gear is further disposed between the first and second coupling gears and the rotary table. The third coupling gear is moved by a cylinder mechanism between a first position in which the third coupling gear is separated from the first and second coupling gears and a second position in which the third coupling gear is brought into engagement with the first and second coupling gears while the force produced by the cylinder mechanism is transmitted to the rotary table via the third gear, first gear and support member so that the periphery of the rotary table is pushed against the guide surface of the table base.

6 Claims, 4 Drawing Sheets

ROTARY TABLE WITH INDEX APPARATUS

BACKGROUND OF THE INVENTION

1. Field of the Invention

This invention relates to a rotary table with an index apparatus for indexing the rotary table.

2. Discussion of the Prior Art

A conventional index apparatus for indexing a table of a machine tool is disclosed by Japanese Patent Application Laid Open No. 24380/1973. The indexing apparatus is provided with a table base by which a rotary table is supported for rotational movement about a vertical axis, and a piston member which is arranged in the table base to be hydraulically moved in a vertical direction while the rotational movement thereof is prohibited. In the index apparatus, three coupling gears are arranged for accurately indexing the rotary table. Namely, the first coupling gear mechanically connected to the rotary table is coaxially arranged with respect to the second coupling gear fixed to the table base, and these coupling gears are formed with coupling teeth at their upper surfaces. Further, the third coupling gear is fixed to the above-mentioned piston member, and is formed with coupling teeth at its lower surface to be engaged with the first and second coupling gear when the piston member is moved downward. The third coupling gear is composed of an inner gear portion fixed directly to the piston member and an outer gear portion which is connected to the inner gear portion via an elastic member which allows the vertical movement of the outer gear portion.

Before the rotary table is rotated, the piston member is initially moved upward to break off the engagements between the first and second coupling gears and the third coupling gear, and the rotary table is then rotated by a predetermined angle. The piston member is then moved downward so that the inner and outer gear portions of the third coupling gear are meshed with the second and first coupling gears, respectively, whereby the rotary table is slightly rotated. With this operation, a workpiece mounted on the rotary table is accurately positioned to a desired angular position for machining.

As mentioned above, in the conventional indexing apparatus, the third coupling gear is divided into the inner and outer gear portions which are connected with each other via the elastic member. The conventional index apparatus therefore has the following advantages:

1) The rotary table can be accurately positioned to a desired angular position, because the assembling errors of the first, second and third coupling gears can be absorbed by the deformation of the elastic member.

2) The positioning accuracy in the vertical direction of a workpiece can be improved, because the rotary table is indexed without any vertical movement.

However, in the conventional index apparatus, the rotary table becomes unstable in some cases, because the periphery of the rotary table is not supported by the table base in the vertical direction. Accordingly, when an eccentric load or unbalanced load acts on the rotary table due to the shape or the mounting position of the workpiece, or when a large cutting force acts on the workpiece during machining operations, the rotary table is partially lifted from the table base, whereby the machining accuracy deteriorates.

SUMMARY OF THE INVENTION

Accordingly, it is an object of the present invention to provide a rotary table with an improved index apparatus, which is capable of preventing the rotary table from lifting up from a table body even when an eccentric load or a large cutting force acts on the rotary table during machining, thereby improving the machining accuracy.

Briefly, the present invention provides a rotary table with an improved Index mechanism. The rotary table is supported by a table base for rotation while the periphery of the rotary table is guided by the guide surface of the table base. The index mechanism includes first and second circular coupling gears disposed on the table base in coaxial relationship with the rotational axis of the rotary table, the second coupling gear being fixed to the table base; a third circular coupling gear disposed between the first and second coupling gears and the rotary table in coaxial relationship with the rotational axis of the rotary table; and a support member fixed to the rotary table for elastically supporting the first coupling gear in the direction parallel to the rotational axis of the rotary table and prohibiting the rotation of the first coupling gear with respect to the table. The index apparatus further comprises an actuator for moving the third coupling gear between a first position in which the third coupling gear is separated away from the first and second coupling gear and a second position in which the third coupling gear is brought into engagement with the first and second coupling gear while the force produced by the actuator is transmitted to the rotary table via the third gear, first gear and support member so that the periphery of the rotary table is pushed against the guide surface of the table base.

When the third coupling gear is moved from the first position to the second position, it engages the first coupling gear mechanically coupled with the rotary table and the second coupling gear fixed to the table base, whereby the rotary table is angularly positioned accurately in a manner similar to that of the above-mentioned conventional index apparatus. Moreover, the periphery of the rotary table is thrust against the guide surface of the table body. Therefore, the rotary table is prevented from lifting up from the guide surface even when the rotary table receives a large force such as cutting force from a tool or an unbalanced load from a workpiece supported on the rotary table. Therefore, it is possible to improve the machining accuracy, especially, the accuracies in dimensions and positions which are influenced by the accuracy in the vertical position of the workpiece.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiment when considered in connection with the accompanying drawings, in which.

DETAILED DESCRIPTION OF PREFERRED EMBODIMENT

An embodiment of the present invention will now be described with reference to drawings.

Figure 1:
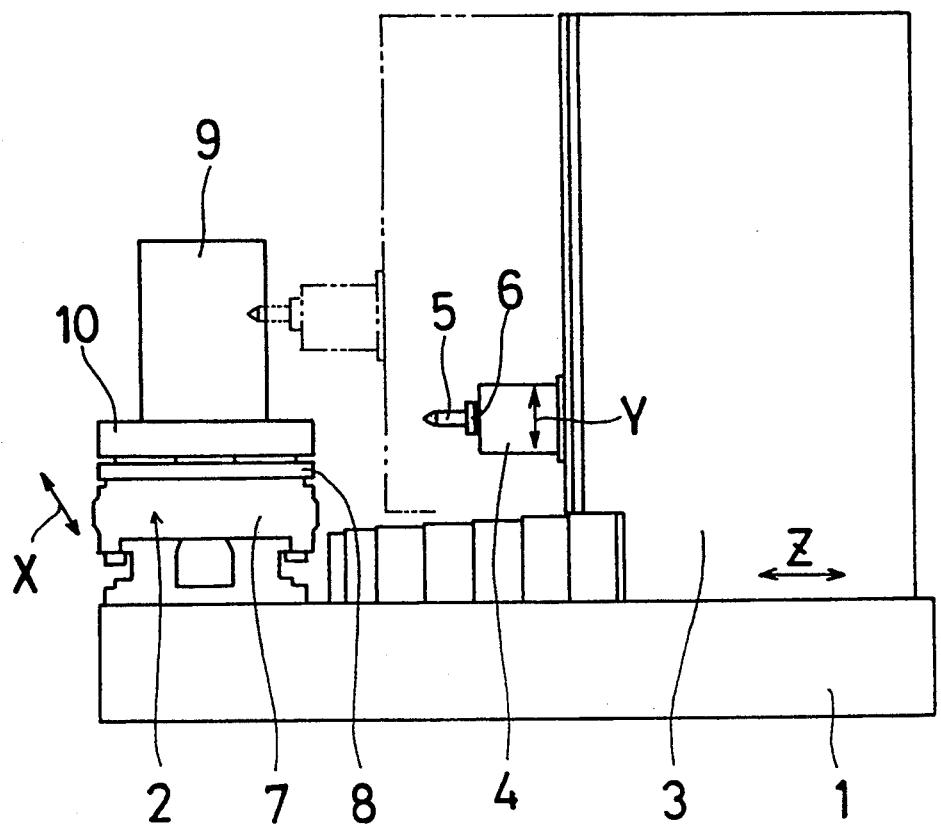
FIG. 1 is a side view of a machine tool having a rotary table with an index apparatus according to the present invention.

FIG. 1 shows a side view of a machine tool having a rotary table with an index apparatus according to a preferred embodiment of the present invention. In FIG. 1, numeral 1 represents a bed on which a table unit 2 and a column 3 are mounted for movement in X-axis direction (direction perpendicular to the drawing sheet as viewed in FIG. 1) and for movement in Z-axis direction (traverse direction as viewed in FIG. 1), respectively. A spindle head 4 is supposed by the column 3 for movement in Y-axis direction (vertical direction), and the spindle head 4 is provided with a spindle 6 to which a tool 5 is detachably attached.

Figure 2:
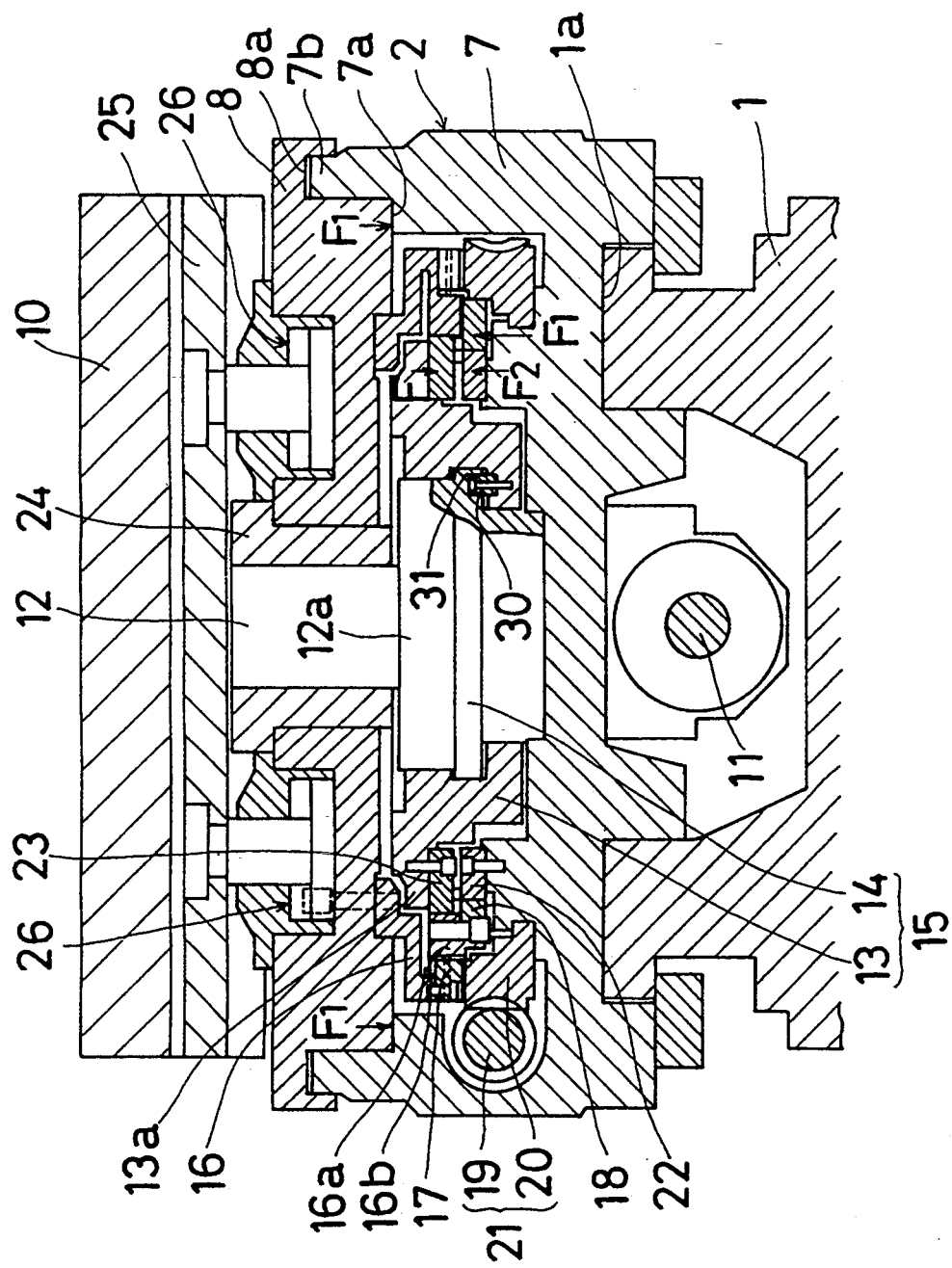
FIG. 2 is a vertical sectional view of the rotary table and index apparatus shown in FIG. 1.

The table unit 2 is composed of a slide table 7 which constitutes a table base in the present invention and a rotary table 8 supported by the slide table 7. The slide table 7 is guided by guide surfaces 1a formed on the bed 1 for sliding movement in the X-axis direction, and is drivingly connected to a servomotor (not shown) via a feed screw 11, as shown in FIG. 2. Mounted on the rotary table 8 is a pallet 10 on which a workpiece 9 is removably attached.

The slide table 7 has a cylindrical inner space and is provided with a center support shaft 12 arranged at the center of the inner space and extending upward in a vertical direction. The rotary table 8 is supported by the center support shaft 12 through a bearing member 24 to be rotatable about the center support shaft 12. The slide table 7 is provided with a circular guide surface 7a which is formed in such a way to surround the inner space. The periphery of the rotary table 8 is supported by the guide surface 7a. At the peripheral reverse portion or the rotary table 8, a circular groove 8a is formed to receive an upwardly extending circular protrusion 7b of the slide table 7, which is formed at a radial position outside of the guide surface 7a. The rotary table 8 is further provided with a clamper 25 for clamping the pallet 10, and a pair of cylinders 26 for moving the clamper 25.

Next, the structure of the table index apparatus according to the present invention will now be mentioned.

A movable cylinder 13 is supported by a guide portion 12a of the center support shaft 12 to form a cylinder mechanism 15 in cooperation with a piston portion 14 formed on the guide portion 12a of the center support shaft 12. The movable cylinder 13 is provided with a pin 30 which is received by a pin hole 31 formed at the lower end of the piston portion 14 of the center support shaft 12 so that the rotation of the movable cylinder 13 is prevented.

A circular support member 16 is attached to the reverse-side surface of the rotary table 8. The support member 16 is formed with a circular slit 16a extending radially in a horizontal plane so as to constitute a deformable portion 16c around the slit 16a, whereby the lower portion 16b of the support member 16 is allowed to vertically move with respect to the rotary table 8, but is prevented from rotating with respect to the rotary table 8. The circular support member 16 may be made of an elastic material.

Fixed to the lower portion 16b of the support member 16 are an engagement block 17, and a first coupling gear 18 having a ring-like shape. The first coupling gear 18 is attached to the support member 16 in such a way that the center thereof coincides with the rotational axis of the rotary table 8, or the axis of the center support shaft 12.

The engagement block 17 is engaged with the upper end portion of a worm wheel 20 for bodily rotation therewith. The engagement block 17 is allowed to vertically move with respect to the worm wheel 20. The worm wheel 20 is guided by the slide table 7 for rotation while the vertical movement thereof is prevented. The worm wheel 20 is meshed with a worm 19 rotated by a servo motor (not shown). The motor, worm 19 and worm wheel 20 constitute a driving mechanism 21 for rotating the rotary table 8.

Figure 3:
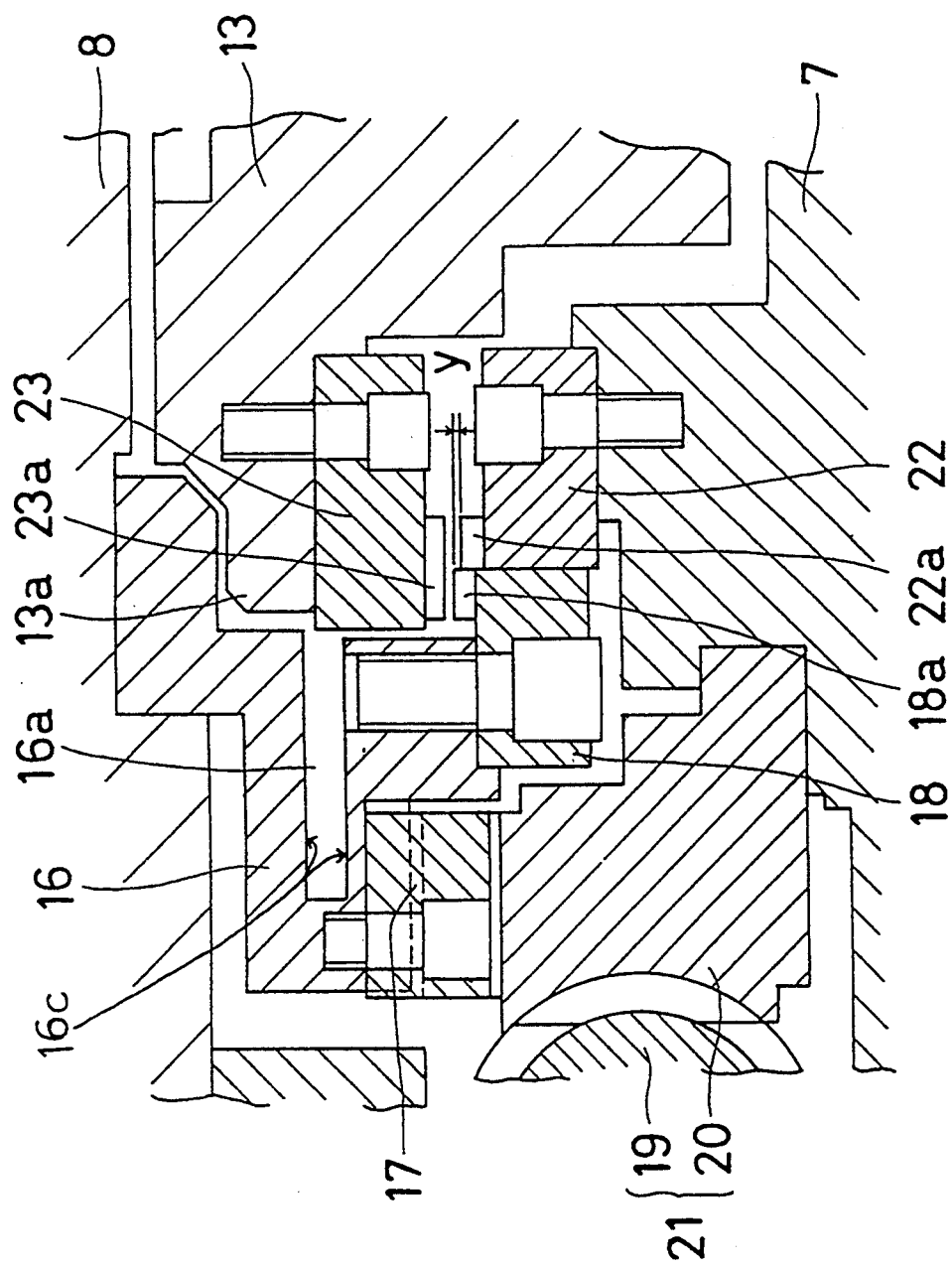
FIG. 3 is an enlarged sectional view of the index apparatus showing the state where a movable cylinder is in its upward stroke end.
Figure 4:
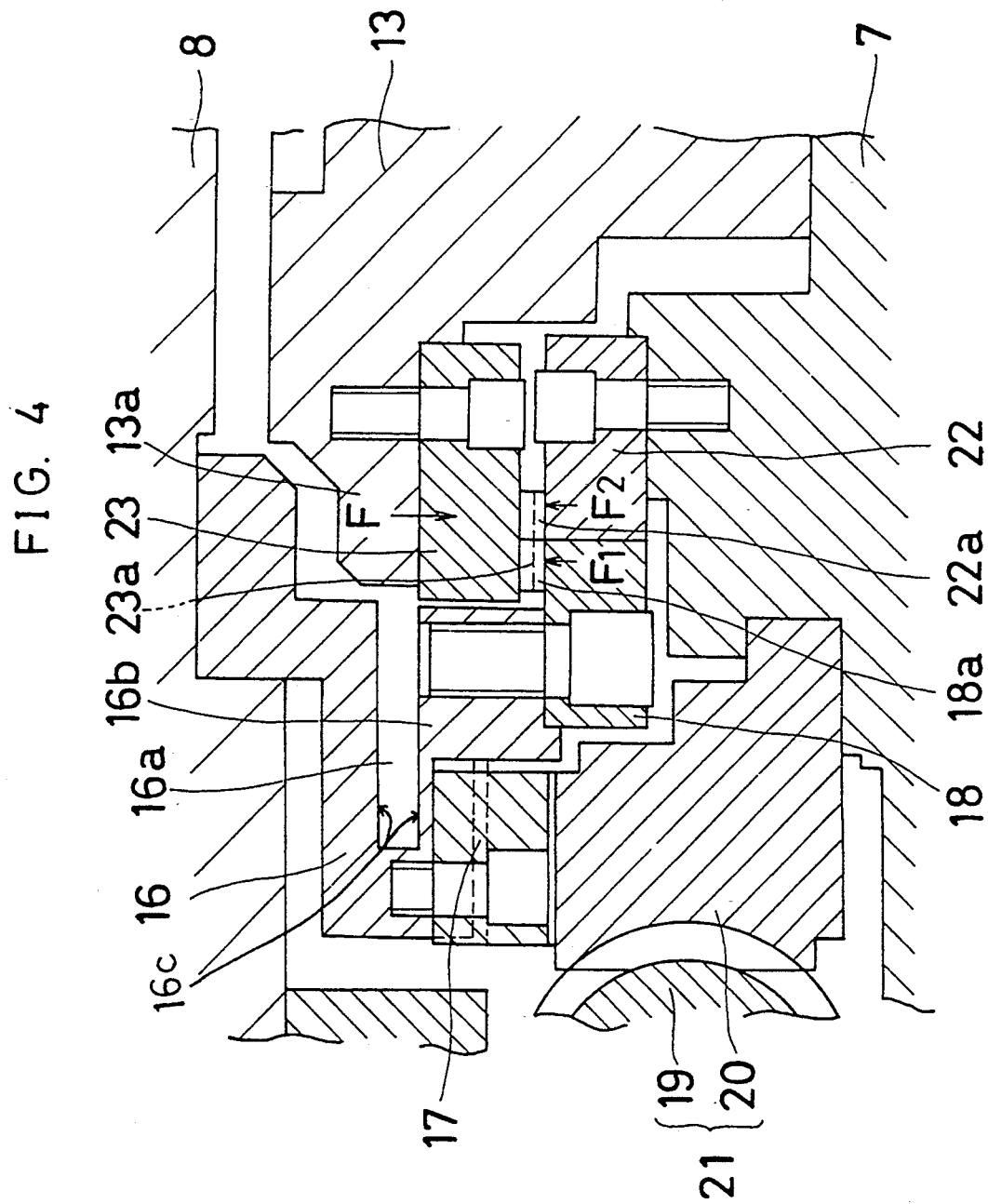
FIG. 4 is an enlarged sectional view of the index apparatus showing the state where the movable cylinder is moved downward.

As shown in FIGS. 3 and 4, a second coupling gear 22 having a ring-like shape is fixed to the slide table 7 by means of bolts to be located on radially inner side or the first coupling gear 18 and to be adjacent to and coaxial with the first coupling gear 18. The first coupling gear 18 and second coupling gear 22 are provided on their upper surfaces with plural engagement teeth 18a and 22a, respectively. The engagement teeth 18a and 22a are formed at predetermined constant intervals in the circumferential direction so that the number of the teeth 18a is equal to the number of the teeth 22a.

Further, a third coupling gear 23 is fixed by means of bolts to the lower surface of a flanged portion 13a of the movable cylinder 13 which extends outward from the upper end of the movable cylinder 13. The third coupling gear 23 is provided with engagement teeth 23a which is engagable with the teeth 18a and 22a of the first and second coupling gears 18 and 22 by downward movement of the movable cylinder 13. The number of teeth 23a is the same as those of the teeth 18a and 22a.

Although the numbers and pitches of the teeth of the first, second and third coupling gears 18, 22 and 23 may freely be determined, the teeth are formed at intervals of 10 degrees in the present embodiment.

The first, second and third coupling gears 18, 22 and 23 are arranged so that their centers coincide with the axis of the center support shaft 12, namely, the rotational axis of the rotary table 8. When the movable cylinder 13 is located at its upper stroke end, the third coupling gear 23 is separated from the first and second coupling gears 18 and 22. In such state, the upper surface of the first coupling gear 18 is located at a vertical position higher than the upper surface of the second coupling gears 22 by a predetermined amount y, as shown in FIG. 3.

Next, the operation of the above-mentioned index apparatus will now be described. After the pallet 10 supporting the workpiece 9 is loaded onto the rotary table 8, the cylinders 26 are actuated to move the clamper 25 downward so that the pallet 10 is fixed to the rotary table 8.

After that, an index operation is carried out. Namely, the cylinder mechanism 15 provided in the slide table 7 is actuated to move the movable cylinder 13 upward so that the third coupling gear 23 fixed to the movable cylinder 13 is also moved upward. With this operation, the third coupling gear 23 is separated from the first and second coupling gears 18 and 22. Regardless of this operation, the rotary table 8 remains in the same vertical position without being lifted, so that the support of the peripheral portion of the rotary table 8 by the guide surface 7a of the slide table 7 is maintained.

In such state, the not-shown servomotor of the index mechanism 21 is driven in accordance with the command signals from a numerical controller (not shown), whereby the rotary table 8 is driven through the worm 19, worm wheel 20, engagement block 17 and support member 16 to rotate about the center support shaft 12 by a commanded amount and then to stop. With this rotation, the pallet 10 supported on the rotary table 8 is rotated so that a predetermined machining portion of the workpiece 9 faces the tool 5. In such state, the teeth 18a of the first coupling gear 18 fixed to the rotary table 8 though the support member 16 are approximately aligned with the teeth 22a of the second coupling gear 22 fixed to the slide table 7, but are not aligned precisely with the teeth 22a due to the backlash between the worm 19 and worm wheel 20.

Then, the cylinder mechanism 15 is operated to move the movable cylinder 13 downward, so that the third coupling gear 23 is moved downward. During this movement, the teeth 23a of the third coupling 23 are firstly engaged with the teeth 18a of the first coupling gear 18 located at a higher location with respect to the teeth 22a of the second coupling gear 22. The first coupling gear 18 is then caused to move downward against the elastic force generated by the support member 16, so that the third coupling gear 23 is also engaged with the second coupling gear 22. When the downward movement of first coupling gear 18 is stopped due to the engagement with the second coupling gear 22, the vertical position of the first coupling gear 18 becomes equal to that of the second coupling gear 22, whereby the lower portion 16b of the support member 16 is lowered by the distance from its original position by the amount y. By the engagement of the third coupling gear 23 with the first and second coupling gear 18 and 22, the rotary table 8 is rotated by a small amount to be located precisely at the commanded angular position. Therefore, the workpiece 9 is accurately oriented so that the machining portion of the workpiece 9 faces the tool with a desired angle or posture.

In such a state, the hydraulic force F generated by the cylinder mechanism 15 acts on first and second coupling gears 18 and 22 through the third coupling gear 23, so that a force F1, which is a part of the force F, acts on the teeth 18a of the first coupling gear 18 and the remaining force F2 (F-F1) acts on the teeth 22a of the second coupling gear 22, respectively. The forces F1 and F2 produce a positioning force in the rotational direction of the rotary table 8, whereby the rotary table 8 is slightly rotated so that the rotary table 8 is accurately positioned to the desired angular position.

The downward force F1 is produced due to an elastic deformation of the support member 16 which occurs when the movable cylinder 13 is lowered until the third coupling gear 23 is completely engaged with the second coupling gear 22. Therefore, the downward force F1 is constant regardless of the magnitude of the hydraulic force F generated by the cylinder 15.

The downward force F1 acts on the rotary table 8 as a downward force via the support member 16 so that the periphery of the rotary table 18 is securely seated on the guide surface 7a of the slide table 7.

The downward force F1 prevents the rotary table 8 from lifting up from the guide surface 7a even when the rotary table 8 receives forces such as cutting forces generated by the tool 5 during machining operations. The hydraulic force F and the elasticity of the support member 16 are determined so that the downward force F1 and F2 are sufficiently large, taking the maximum load acting on the rotary table 8 into consideration.

By the above-mentioned operation, the peripheral portion of the rotary table 8 is securedly seated on the guide surface 7a of the slide table 7, so that the workpiece 9 supported by the rotary table 8 via the pallet 10 is precisely positioned in the vertical direction while being angularly positioned accurately. Keeping such state, the workpiece 9 is machined by the tool 5 held by the spindle 6 of the machine tool.

Upon the completion of the machining of the workpiece 9, the rotary table 8 is rotated to a predetermined angular position for loading-unloading operation. When the cylinder 26 is actuated, the pallet 10 is released from the clamper 25, and is unloaded from the rotary table 8. After that, the pallet 10 is then again loaded onto the rotary table 8 after the attachment of a new workpiece, and is again clamped by the clamper 25. The above-mentioned index operation is thereafter carried out for machining the new workpiece.

In the above-mentioned embodiment, the workpiece is mounted on the rotary table 8 with the aid of the pallet 10. The present invention, however, may be applied to a machine tool in which workpieces are mounted directly on the rotary table. Also, a roller bearing may be disposed between the periphery of the rotary table and the guide surface of the slide table. Moreover, the present invention can be applied to a machine tool in which a rotary table is supported by a stationary table base, while the spindle head is moved in three dimensions.

In the above-mentioned embodiment, the rotary table is supported by the slide table for rotation about a vertical axis. The present invention, however, can be applied to other types of rotary tables which are supported by their table base for rotation about a horizontal axis.

Obviously, numerous modifications and variations of the present invention are possible in light of the above teachings. It is therefore to be understood that within the scope of the appended claims, the present invention may be practiced otherwise than as specifically described herein.

What is claimed is:

1. A rotary table with an index apparatus comprising:
   a table base having a circular flat guide surface;
   a rotary table supported by said table base for rotation, with a peripheral reverse surface thereof being guided by the flat guide surface of said table base;
   a drive mechanism mechanically coupled with said rotary table for rotating said rotary table;
   first and second circular coupling gears disposed on said table base in coaxial relationship with the rotational axis of said rotary table, said second coupling gear being fixed to said table base, and said peripheral reverse surface of the rotary table being located radially outside of said first and second coupling gears:
   a third circular coupling gear disposed between said first and second coupling gears and said rotary table in coaxial relationship with the rotational axis of said rotary table;
   a support member fixed to said rotary table for elastically supporting said first coupling gear in a direction parallel to the rotational axis of said rotary table without permitting the rotation of said first coupling gear with respect to said rotary table, said support member normally holding said first coupling gear at a higher position than said second coupling gear; and an actuator for moving said third coupling gear between a first position at which said third coupling gear is separated from said first and second coupling gears and a second position at which said third coupling gear is brought into engagement with both of said first and second coupling gears through the elastic deformation of said support member while the force produced by said actuator is transmitted to said rotary table via said third coupling gear, first coupling gear and support member so that the peripheral reverse surface of said rotary table is thrust against the flat guide surface of said table base with a uniform force over the entire circular length thereof.

2. A rotary table with an index apparatus according to claim 1, wherein said actuator comprises a cylinder mechanism which is composed of a fixed piston formed on a center support shaft which is disposed at a center portion of said table base for supporting said rotary table for rotational movement, and a movable cylinder which receives said fixed piston and fixedly supports said third coupling gear.

3. A rotary table with an index apparatus according to claim 1, wherein said rotary table is formed on said peripheral reverse surface with a circular groove, while said table base is formed radially outside of said flat guide surface with a protrusion which is received by said circular groove.

4. A rotary table with an index apparatus according to claim 1, wherein said drive mechanism comprises;

a worm wheel supported by said table base for rotation about the rotational axis of said rotary table;

a worm meshing with said warm wheel for rotating said worm wheel; and an engagement block fixed to said support member and engaged with said worm wheel in the rotational direction of said rotary table.

5. A rotary table with an index apparatus comprising:

a table base having a center support shaft and a circular flat guide surface formed to surround said center support shaft;

a rotary table supported by the center support shaft of said table base for rotation about said center support shaft, with a peripheral reverse surface of said rotary table being guided by the flat guide surface of said table base;

a drive mechanism mechanically coupled with said rotary table for rotating said rotary table;

first and second circular coupling gears disposed on said table base in coaxial relationship with said center support shaft, said second coupling gear being fixed to said table base, and said peripheral reverse surface of the rotary table being located radially outside of said first and second coupling gears;

a third circular coupling gear disposed between said first and second coupling gears and said rotary table in coaxial relationship with said center support shaft;

a support member fixed to said rotary table for elastically supporting said first coupling gear in a direction parallel to said center support shaft without permitting the rotation of said first coupling gear with respect to said rotary table, said support member normally holding said first coupling gear at a higher position than said second coupling gear; and a cylinder mechanism for moving said third coupling gear between a first position at which said third coupling gear is separated from said first and second coupling gears and a second position at which said third coupling gear is brought into engagement with both of said first and second coupling gears through the elastic deformation of said support member while the force produced by said cylinder mechanism is transmitted to said rotary table via said third coupling gear, first coupling gear and support member so that the peripheral reverse surface of said rotary table is thrust against the flat guide surface of said table base with an uniform force over the entire circular length thereof, said cylinder mechanism being composed of a fixed piston formed on the center support shaft, and a movable cylinder which receives said fixed piston and fixedly supports said third coupling gear.

6. A rotary table with an index apparatus according to claim 5, wherein said drive mechanism comprises;

a worm wheel supported by said table base for rotation about the center of the rotation of said rotary table;

a worm meshing with said warm wheel for rotating said worm wheel; and an engagement block fixed to said support member and engaged with said worm wheel in the rotational direction of said rotary table.

* * * * *